(12) United States Patent
Hennon et al.

(10) Patent No.: US 10,283,896 B1
(45) Date of Patent: May 7, 2019

(54) LONGITUDINALLY EXPANDABLE ELECTRICAL CONNECTOR

(71) Applicant: ICORE INTERNATIONAL, INC., Santa Rosa, CA (US)

(72) Inventors: Ronald Charles Hennon, Cloverdale, CA (US); Mark McGrath, Santa Rosa, CA (US)

(73) Assignee: SCORE INTERNATIONAL, INC., Santa Rosa, CA (US)

( * ) Notice: Subject to any disclaimer, the term of this patent is extended or adjusted under 35 U.S.C. 154(b) by 0 days.

(21) Appl. No.: 15/950,117

(22) Filed: Apr. 10, 2018

(51) Int. Cl.
| H01R 13/28 | (2006.01) |
| H01R 13/50 | (2006.01) |
| H01R 13/627 | (2006.01) |
| H01R 12/52 | (2011.01) |
| H01R 13/05 | (2006.01) |
| H01R 13/10 | (2006.01) |
| H01R 13/631 | (2006.01) |
| H01R 24/84 | (2011.01) |

(52) U.S. Cl.
CPC ............ *H01R 13/50* (2013.01); *H01R 12/52* (2013.01); *H01R 13/052* (2013.01); *H01R 13/10* (2013.01); *H01R 13/28* (2013.01); *H01R 13/6272* (2013.01); *H01R 13/631* (2013.01); *H01R 23/27* (2013.01); *H01R 24/84* (2013.01)

(58) Field of Classification Search
CPC ......... H01R 13/28; H01R 23/27; H01R 24/84
See application file for complete search history.

(56) References Cited

U.S. PATENT DOCUMENTS

| 526,078 | A | * | 9/1894 | Henck, Jr. | ............... | H01R 13/28 |
| | | | | | | 439/284 |
| 3,065,446 | A | * | 11/1962 | Langzettel | ............. | H01R 12/61 |
| | | | | | | 439/295 |
| 4,045,107 | A | * | 8/1977 | Sutherland | ............. | H01R 13/28 |
| | | | | | | 439/289 |
| 4,166,663 | A | * | 9/1979 | Walker | ................... | G01V 1/201 |
| | | | | | | 439/271 |
| 4,230,389 | A | * | 10/1980 | Kotski | ................... | H01R 13/28 |
| | | | | | | 174/78 |
| 4,500,980 | A | * | 2/1985 | Copeland | ............... | H02G 15/14 |
| | | | | | | 367/154 |
| 6,305,962 | B1 | * | 10/2001 | Maher | ................... | H01R 24/84 |
| | | | | | | 439/287 |
| 9,437,961 | B1 | * | 9/2016 | Smajda | ............. | H01R 13/5219 |
| 2015/0079829 | A1 | * | 3/2015 | Brodsgaard | ............ | H01R 24/84 |
| | | | | | | 439/284 |

* cited by examiner

*Primary Examiner* — Tho D Ta
(74) *Attorney, Agent, or Firm* — Craig M. Stainbrook; Stainbrook & Stainbrook, LLP

(57) ABSTRACT

An electrical connector assembly including a plug having an open end and an inner shell that extends distally to an elongate partial tubular mounting portion, and a complementary receptacle similarly configured so as to form an enclosure with the plug when mated. Each of the plug and receptacle include a longitudinally oriented contact array having a plurality of termination points for terminating conductors and a plurality of contacts for matable electrical contact with the other connector member. A locking feature locks the plug and receptacle in a mated configuration. The connector facilitates the termination of additional conductors without the need to expand the outer diameter or circumference of the connector housings.

14 Claims, 12 Drawing Sheets

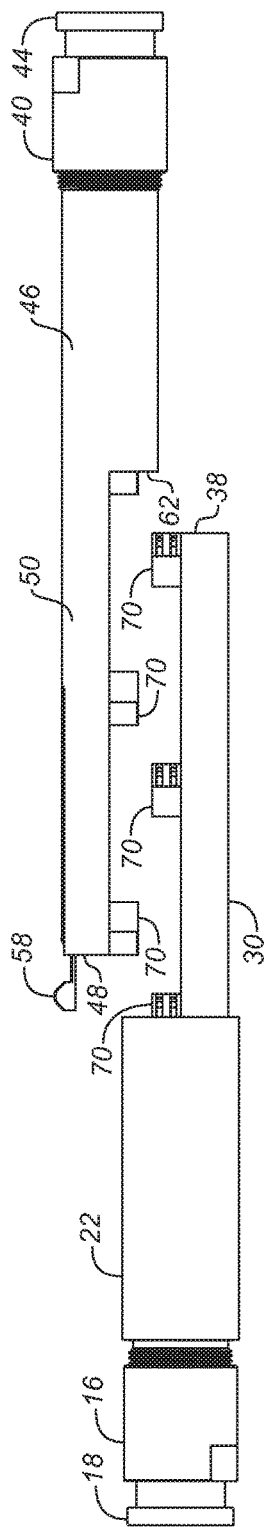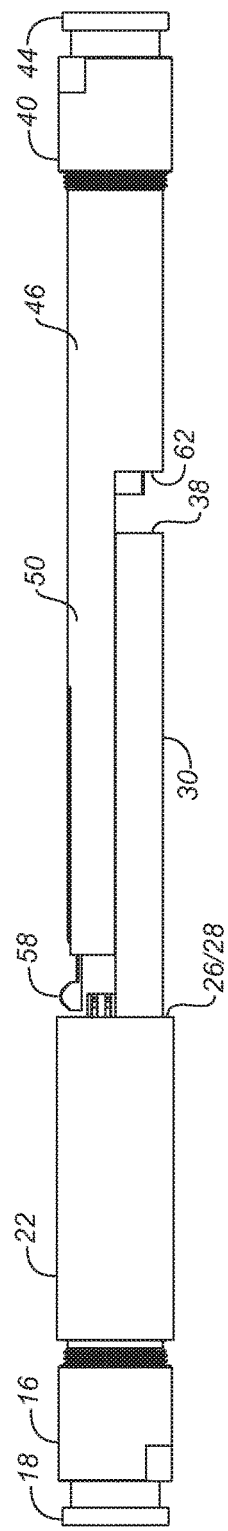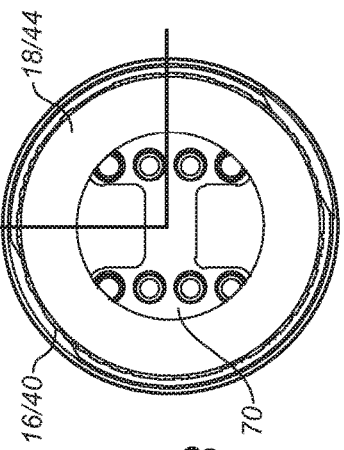

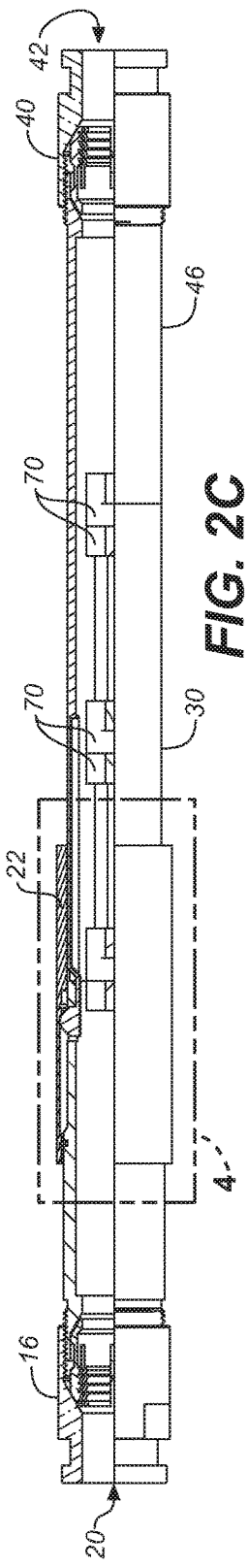
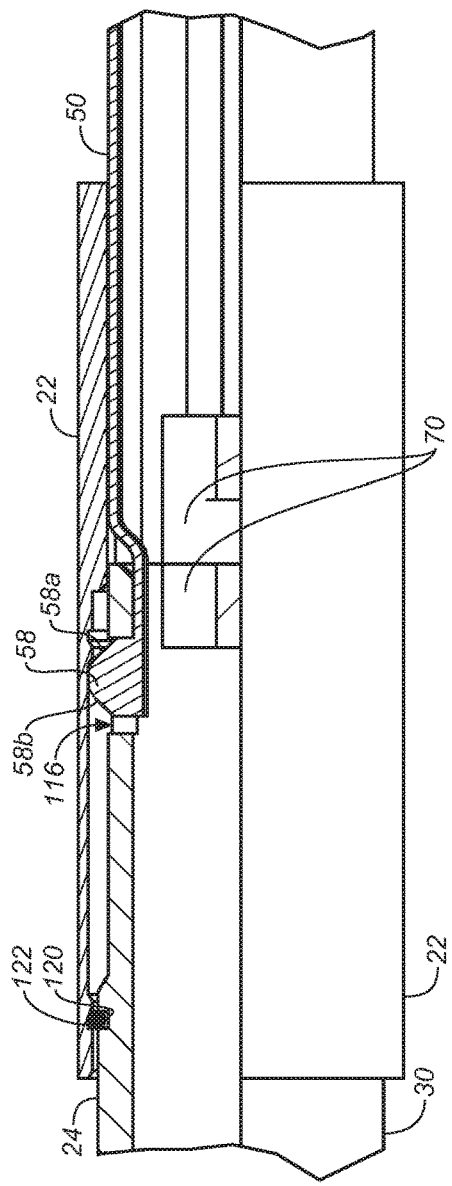
FIG. 2C
FIG. 4

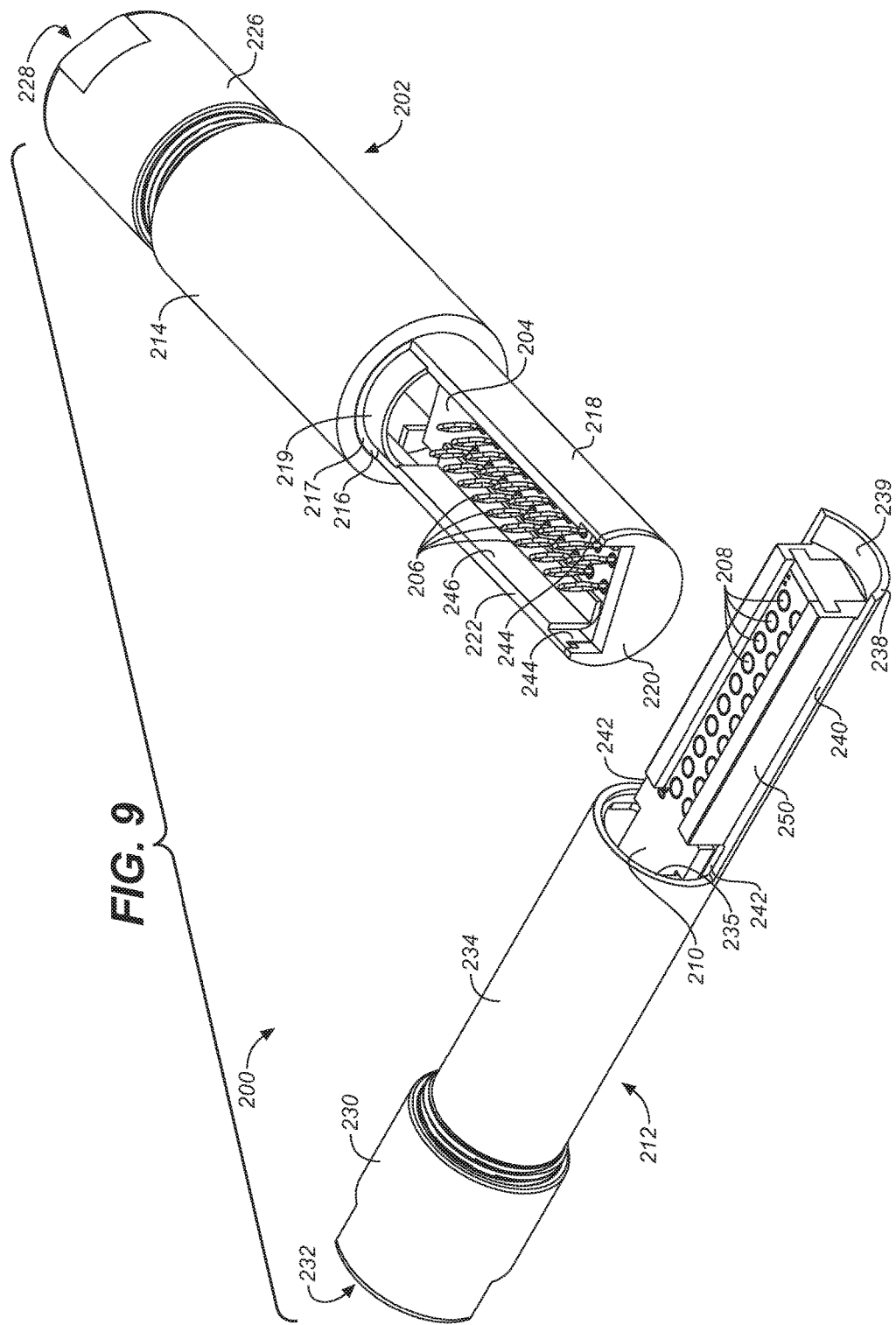

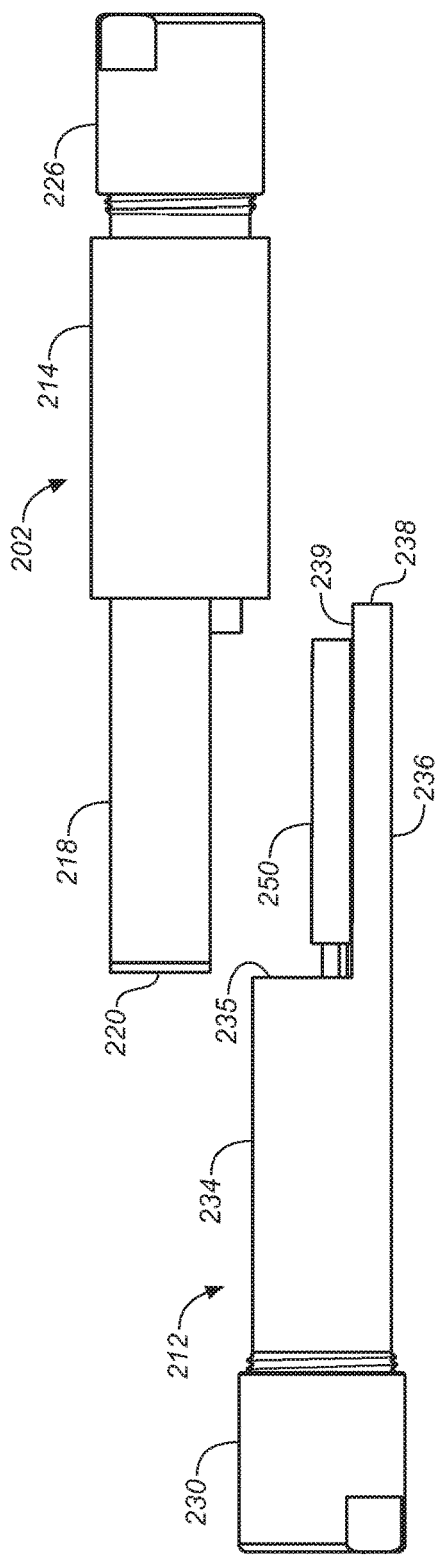
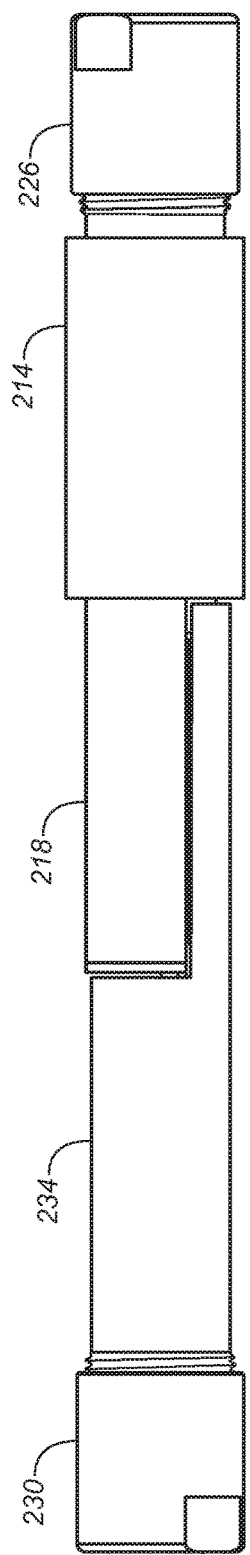
FIG. 10A
FIG. 10B

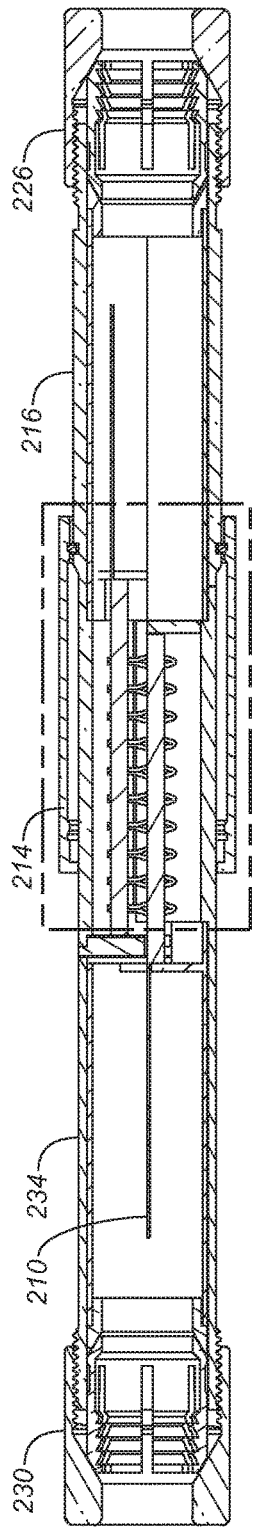
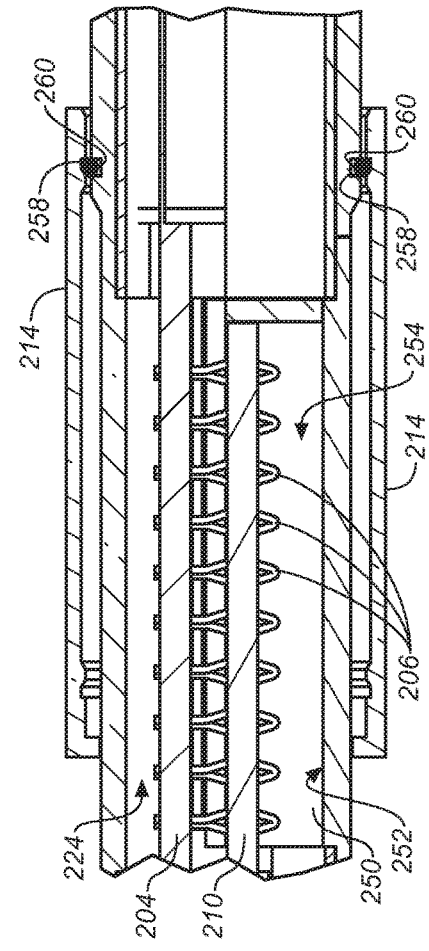
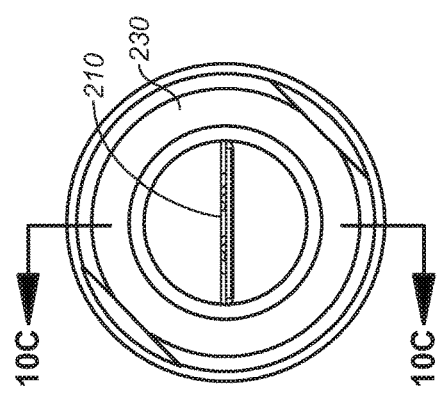

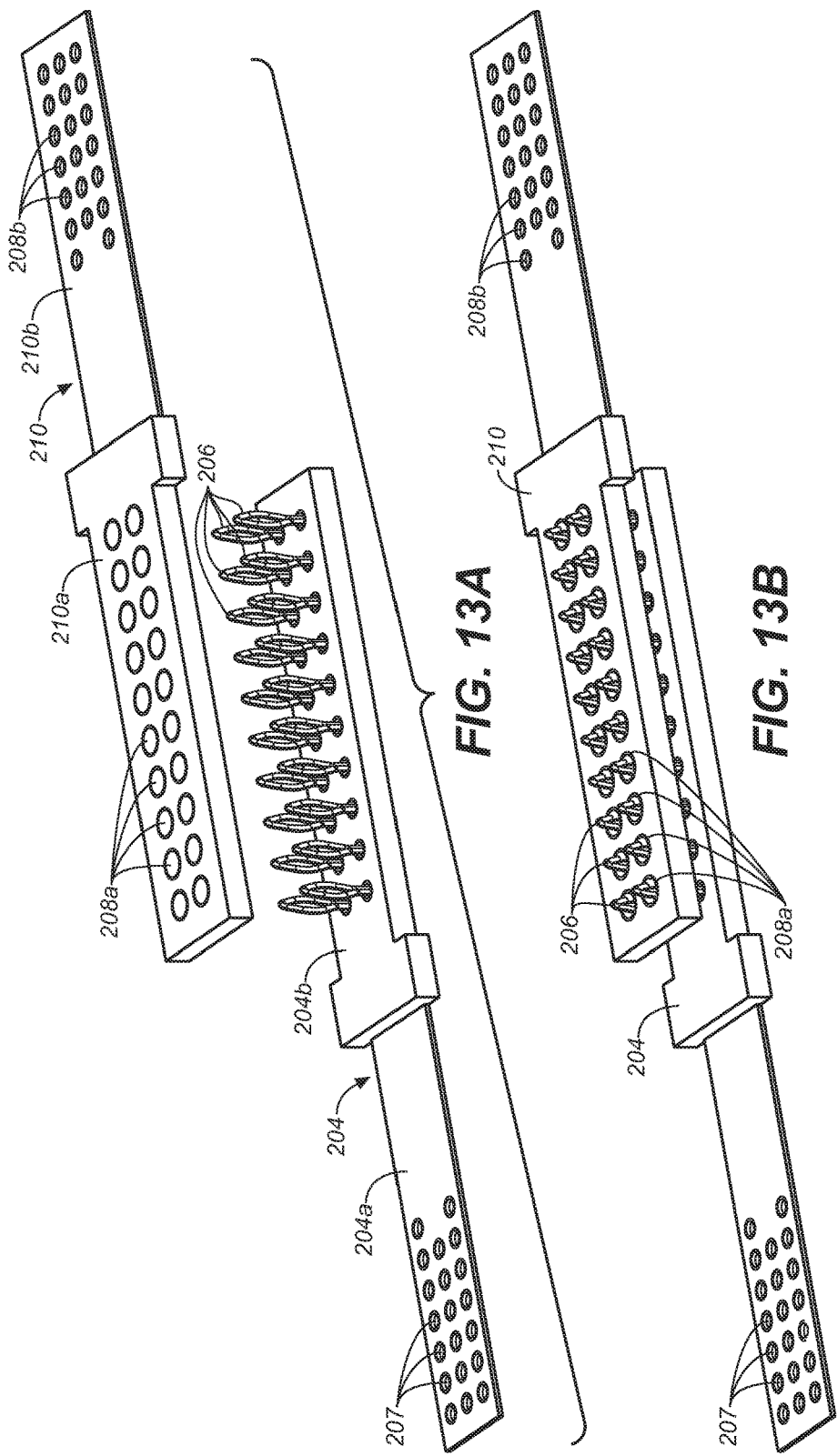

US 10,283,896 B1

LONGITUDINALLY EXPANDABLE ELECTRICAL CONNECTOR

CROSS REFERENCES TO RELATED APPLICATIONS

Not applicable. The present application is an original and first filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates most generally to electrical conduits, cables, and connectors, and more particularly to a longitudinally expandable multi-contact electrical connector assembly for interconnect wiring systems, and still more particularly to an electrical connector having plug and receptacle contact terminations configured in longitudinally oriented structures so as to enable use of an increasing number of contacts without increasing the diameter or cross-sectional dimension of the connector. The inventive apparatus is particularly adapted for use in highly confined spaces, such as in aircraft electrical connector panels, in which large numbers of electrical cables converge for organization and sorting through harnesses and other cable organization apparatus and for connection to navigation, communication, and electronics systems.

Background Discussion

Vehicle and aircraft systems are frequently located remotely from power and signal sources, and conductors and cables frequently pass through structural boundaries, bulkheads, panels, chassis, and walls separating vehicle/aircraft primary structures—wings from fuselage, cargo area from cabin, cabin from tail assembly, power plants from wing or cockpit, fuselage from landing gear, and so forth. Wiring for cabin systems, environmental controls and lighting, avionics, flight controls, auxiliary power units and engine-driven alternators, as well as backup power supplies, AC inverters, control systems, servo motors, electric-over-hydraulic motors and actuators, lights, and so forth, are typically bundled and organized in harness assemblies and infrequently contained in conduit (because of weight limitations). The assemblies and their conductors take up considerable space, especially at bends, junctions, and barrier walls. Space constraints and the need to protect structural integrity and to secure interior air pressures and climate put a premium on minimizing barrier penetrations, thus the space dedicated to electrical connectors and harness assemblies.

Indeed, routing of cable harnesses within aircraft is sometimes not even possible because a terminated connector is too large in diameter to pass through an opening. The diameter of standard multi-contact connectors is a function of the number and size of the contacts. The problem of routing and "fit" thus usually occurs when a connector has a large number of contacts for a bundle of heavy gauge conductors, which require larger contacts. Therefore, there is a continuing motivation to reduce the space and weight consumed by multi-contact electrical connectors for electrical components, particularly in aircraft.

The current solution for this ongoing problem is to provide a cable harness with some or all conductors remaining unattached (thus not terminated). The connectors are then terminated to the cable harness after it has been routed within the plane. However, on-site termination of connectors is performed by specialized technicians and increases assembly time and cost. The present invention provides a solution to this problem.

BRIEF SUMMARY OF THE INVENTION

The present invention is an electrical connector assembly that may be expanded longitudinally rather than circumferentially to accommodate an increase in size and/or number of conductors and contacts.

In its most essential aspect, the inventive electrical connector may be characterized as a longitudinally expandable electrical connector, which includes a plug including a proximal end having an opening through which to introduce conductors, an inner shell extending distally from the proximal end and having a distal end, an elongate partial tubular mounting portion extending distally from the distal end of the inner shell, the mounting portion having an inner wall with upper edges and a distal end; a receptacle configured complementarily to the plug and including a proximal end having an opening through which to introduce conductors, an inner shell extending distally from the proximal end and having a distal end, an elongate partial tubular mounting portion extending distally from the distal end of the inner shell, the mounting portion having an inner wall with complementary edges and a distal end, the mounting portion configured such that when the upper edges of the mounting portion of the plug are aligned and approximated to the complementary edges of the mounting portion of the receptacle so as to mate the receptacle with the plug, the plug mounting portion and the receptacle mounting portion form a tubular enclosure and the upper edges of the mounting portion of the plug are approximated to the complementary edges of the mounting portion of the receptacle; a longitudinally oriented plug contact array disposed in the plug and having a plurality of termination points for terminating conductors and a plurality of contacts for matable electrical contact with a complementary array in the receptacle; a longitudinally oriented receptacle contact array disposed in the receptacle complementary to the plug contact array and having a plurality of contacts configured to mate electrically with the plurality of contacts in the plug contact array; and a locking feature for locking the plug and the receptacle in a mated configuration to prevent radial separation of the plug and the receptacle, wherein when the plug and the receptacle are in the mated configuration, the distal end of the plug inner shell approximates the distal end of the mounting portion of the receptacle, and the distal end of the receptacle inner shell approximates the distal end of the mounting portion of the plug.

The configuration of the electrical connector is such that it can accommodate increasingly large numbers of conductors without having to expand the cross-sectional area of the connector (plug and receptacle) housings. As cables or conductors are added, they are terminated at termination points either on a longitudinally disposed PCB or in longitudinally spaced insulator modules, such that the conductor dimensions are distributed along the length of the connector. If the number of conductors exceeds the capacity of a particular connector, a longer connector may be swapped in to provide a larger number of termination points and contacts within the housing, but entirely without the need to expand the cross-sectional area of the connector.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 2A is a side view in elevation of the uncoupled mating pair of expandable connectors of FIG. 1, this view showing the receptacle rotated axially 180 degrees in relation to its orientation in FIG. 1 so as to be poised for mating with the plug;

FIG. 2B is a cross-sectional side view in elevation of the mated pair of FIG. 1;

FIG. 2C is a partial cross-sectional side view in elevation thereof, the section taken along section lines 2C-2C of FIG. 3, and showing the slidable outer shell in a latched position;

FIG. 3 is a proximal end view of either the plug or receptacle members showing the insulator modules located in the housing interior;

FIG. 4 is a detailed cross-sectional view in elevation take along section line 4 of FIG. 2C;

FIG. 9 is an upper perspective view of an alternative embodiment of the expandable connector of the present invention;

FIG. 10A is a side view in elevation of the uncoupled mating pair of expandable connectors of FIG. 9, this view showing the receptacle rotated axially 180 degrees in relation to its orientation in FIG. 9 so as to be poised for mating with the plug;

FIG. 10B is a side view in elevation thereof showing the pair radially mated;

FIG. 10C is a cross-sectional side view in elevation of the mated pair of FIG. 10B take along section line 10C-10C of FIG. 11;

FIG. 11 is a proximal end view of receptacle member thereof;

FIG. 12 is a detailed cross-sectional view in elevation taken along section line 12 of FIG. 10C;

FIG. 13A is an upper perspective view of the PCBs employed in the plug and receptacle portions of the connector of FIGS. 9-11, featuring an array of spring pin contacts sized for insertion in a complementary array of plated through holes;

FIG. 13B is an upper perspective view of the spring contact PCB of FIG. 13A coupled to the PCB of FIG. 13A;

DETAILED DESCRIPTION OF THE INVENTION

Figure 1:
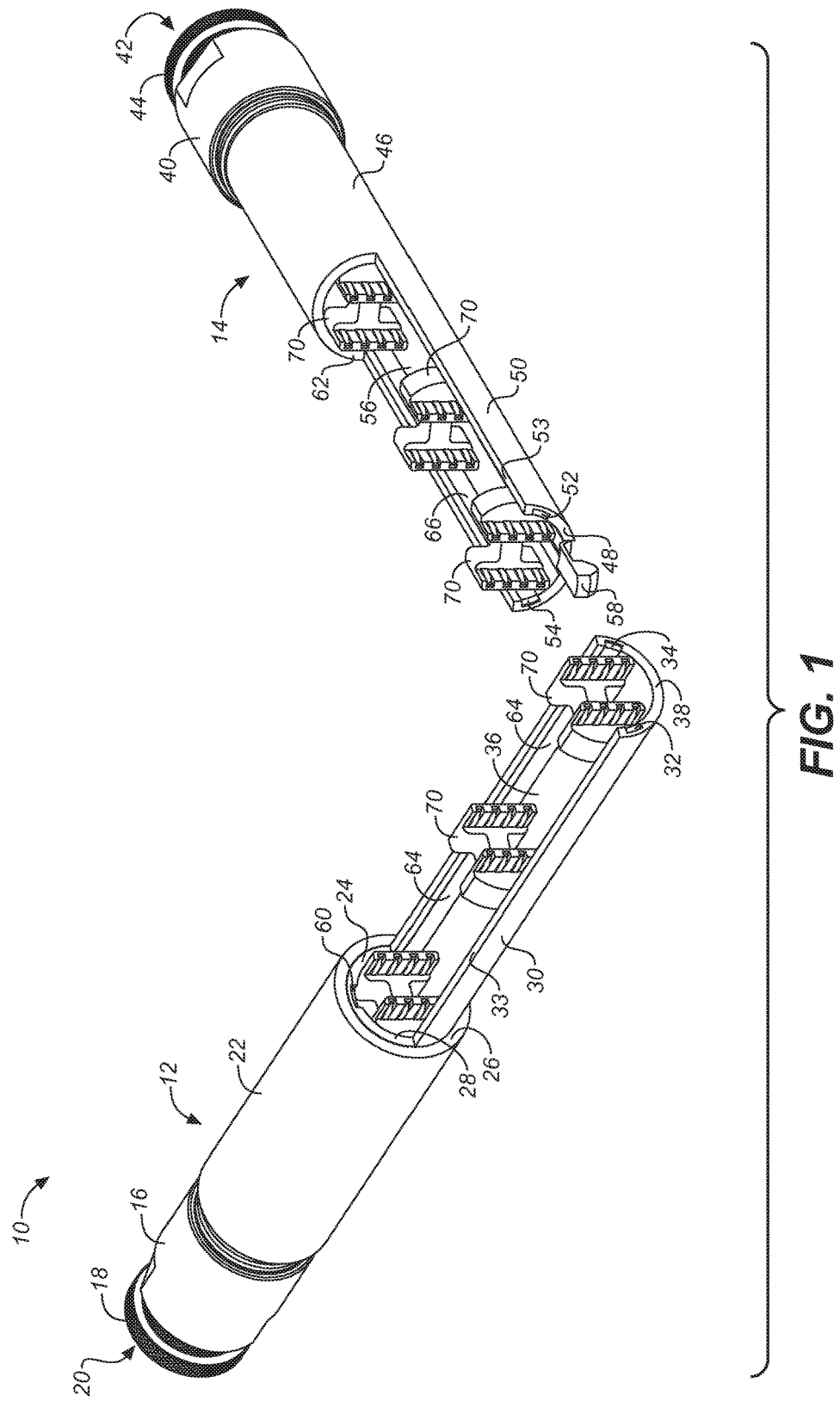
FIG. 1 is an upper perspective view showing an uncoupled mating pair of the longitudinally expandable connectors.
Figure 5:
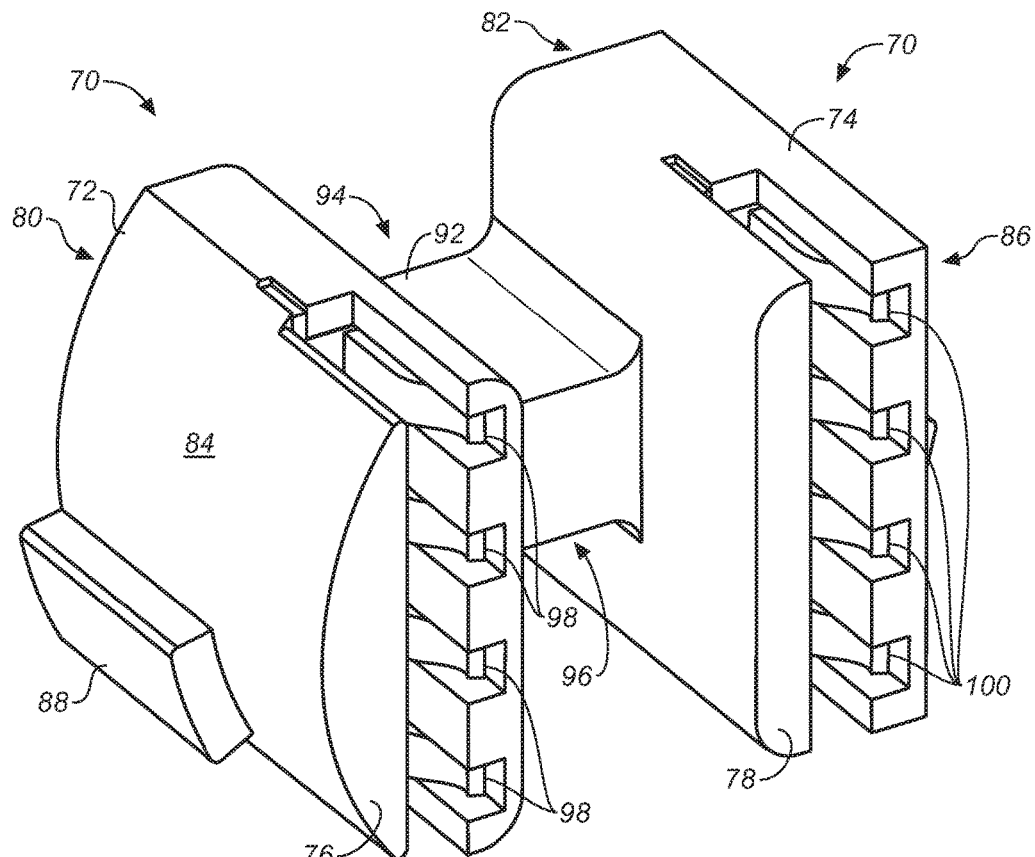
FIG. 5 is an upper perspective view showing a modular insulator employed in the present invention as a platform or support for a plurality of contacts.
Figure 6:
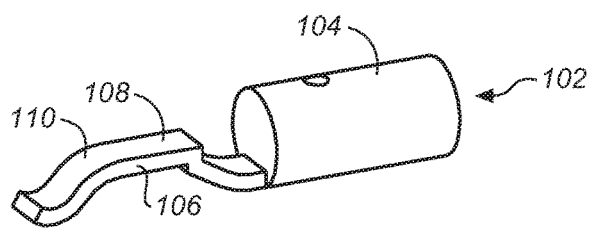
FIG. 6 is an upper perspective view of the crimp/leaf spring contact used in an embodiment of the present invention.

Referring first to FIGS. 1 through 8B, wherein like reference numerals refer to like components in the various views, there is illustrated therein an embodiment of a new and improved electrical connector, generally denominated 10 herein. In this embodiment the device includes first and second connector housings 12, 14, which are complementary and matable, and for convenience are characterized herein as a plug and a receptacle, respectively. As will be immediately appreciated, in an embodiment, the plug 12 and receptacle 14 may be cylindrical in shape (circular in cross section), though other geometries are entirely within the spirit and scope of the present invention, as such variations would have no impact of device function.

The plug and receptacle are each generally hollow tubular shells that can accommodate wires or cables. As such, plug 12 first includes a backshell body 16 and locking collar 18, each well-known in the industry, used to secure cables/connectors and providing strain relief. The backshell body and locking collar include an open proximal end 20 through which cables and/or wire conductors enter and exit the plug. The plug then extends distally as a cylindrical outer shell 22 slidingly disposed over, and surrounding, a cylindrical inner shell 24. When the plug and receptacle are either separated or in the process of being mated or separated, the outer shell is in an unlocked position, as shown in FIGS. 1-2B. The inner shell 24 and slidable outer shell 22 each extend to a distal end 26, 28, respectively, which are coplanar when the outer shell is fully retracted in the most proximal position, as shown in FIG. 1.

Integrally extending from the distal end 28 of the plug inner shell 24 is a partial tubular elongate semi-cylindrical insulator module mounting portion (semi-circular in cross-section) 30 having first and second keyways 32, 34 cut longitudinally along the mounting portion interior wall 36 and extending to openings at the distal end 38 of the mounting portion 30. The mounting portion further includes an upper rim 33.

The second connector housing, i.e., receptacle 14, is in most respects a mirror image of the plug 12. It includes a backshell body 40 having an open proximal end 42 and a locking collar 44, where cables/wire conductors are inserted and secured. An integral outer shell 46 extends from the backshell body 40, has a diameter equivalent to the diameter of the inner shell 24 of the plug 12, and a distal end 48 that abuts the distal end 28 of the inner shell 24 of the plug portion 12 when the pair (plug and receptacle) are mated. It further includes a mounting portion 50 having spaced-apart keyways 52, 54 cut into an interior wall 56, and which open at the distal end 48 for insertion and longitudinal translation of insulator modules 70 identical to those used in the plug portion (and discussed more fully below). The receptacle mounting portion includes complementary edges 53 having dimensions substantially identical to those of the plug mounting portion upper edges 33.

A male element 58 extending from the distal end 48 of mounting portion 50 of receptacle 14 snap-fits into socket 60 in inner shell 24 of plug 12. The outer shell 46 of receptacle 14 has a distal edge 62 that abuts the distal end 38 of the mounting portion 30 of plug 12 (see FIG. 2B).

Figure 7A:
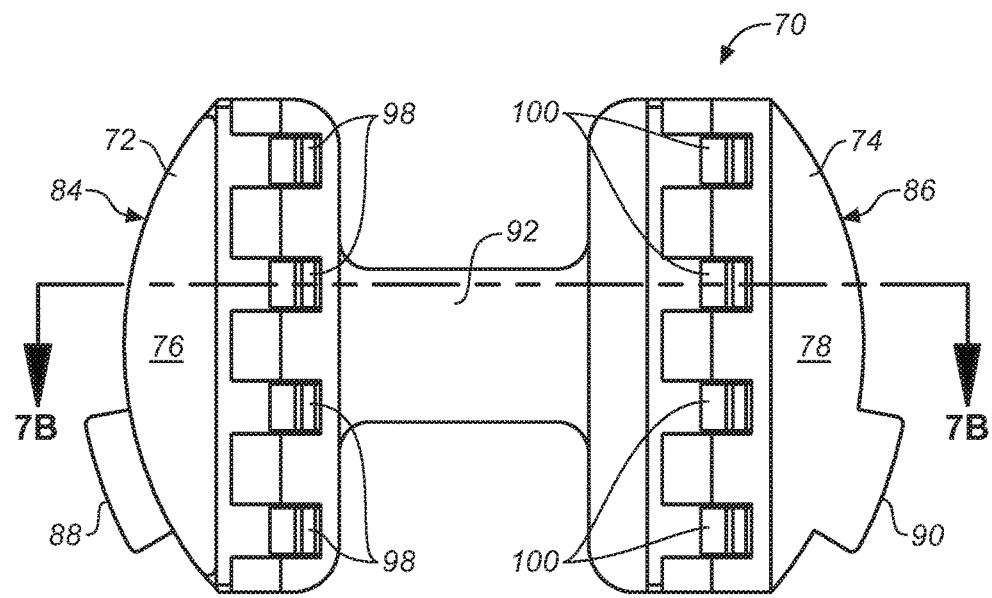
FIG. 7A is a distal end view in elevation of the modular insulator (dielectric) block of FIG. 5, shown rotated 90 degrees relative to its orientation in FIGS. 1 & 5.
Figure 7B:
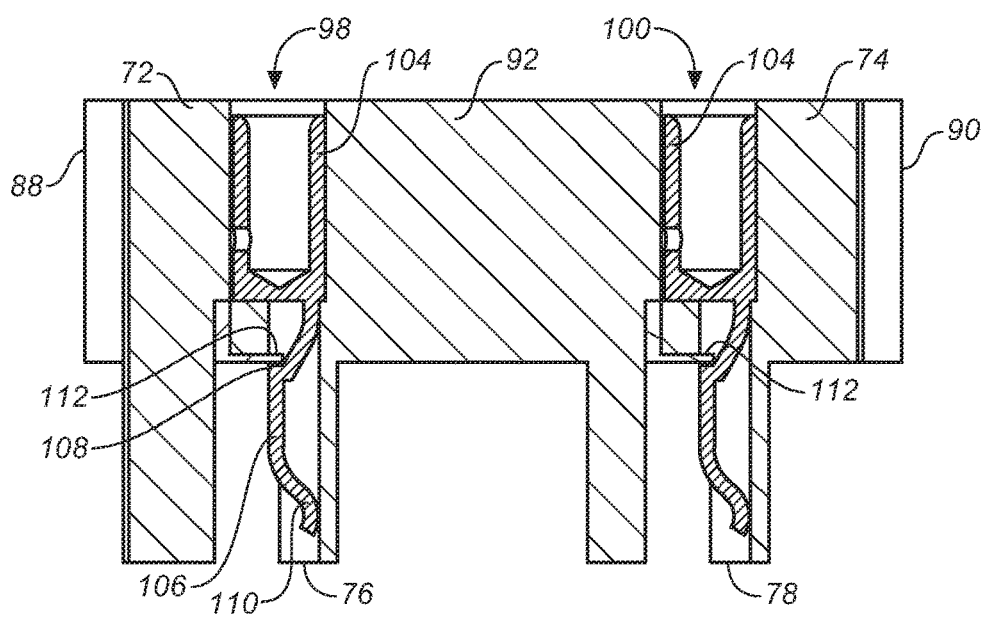
FIG. 7B is a cross-sectional top view in elevation taken along section line 7B-7B of FIG. 7A.
Figure 8A:
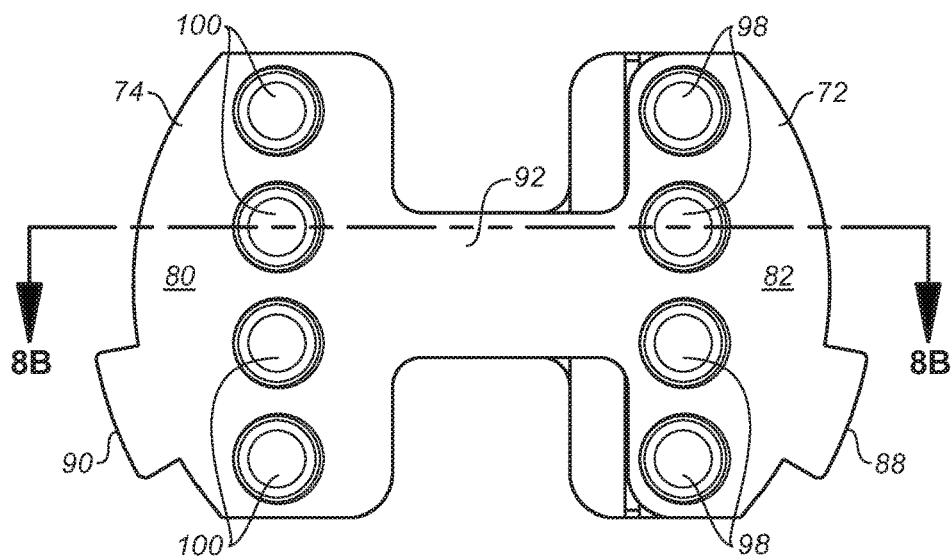
FIG. 8A is a proximal end view in elevation of the modular insulator when mated with, shown with crimp contacts inserted into the contact bores, and also shown rotated 90 degrees relative to its orientation in FIGS. 1 & 5.
Figure 8B:
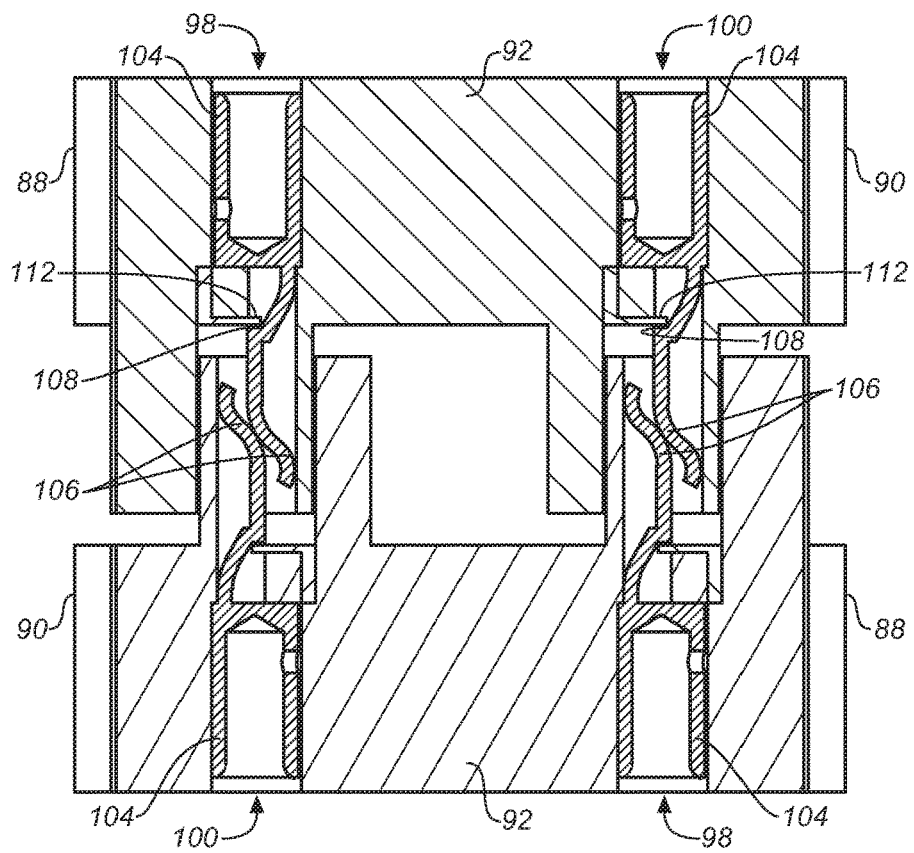
FIG. 8B is a cross-sectional top view of the modular insulator taken along Section line 8B-8B of FIG. 8A.

Modular insulators 70 are disposed on the mounting portions 30, 50 of the plug and receptacle 12, 14, respectively. They are separated along the length of the mounting portion in each of the plug and receptacle by keyway spacers 64, 66, slidingly inserted into the keyways 32, 34, and 52, 54. The modular insulators include generally symmetrical first and second dielectric blocks 72, 74 each having a mating face 76, 78, configured for aligning and indexing with a corresponding and matched modular insulator in an inverted orientation, as seen in FIGS. 2A-3 and FIGS. 8A-8B. Each dielectric block also includes a back face 80, 82, into which crimped conductors are inserted (see exp. FIGS. 7B and 8B). Further, each dielectric block includes a curved outer sidewall surface 84, 86 which closely conforms to the shape of the interior walls 36, 56 of the module mounting portions 30 and 50 of the plug and receptacle, respectively. First and second tabs or keying features 88, 90, are integral with the outer sidewall surfaces. The dielectric blocks 72, 74 are joined by a bridge 92 or cross bar sized to define a space within the enclosed connector for upper and lower wire passageways 94, 96.

When insulator modules 70 are installed in the mounting portions 30, 50, the keying features 88, 90 are aligned with the open keyway slots 32, 34, and 52, 54 at the ends 38, 48, of the plug 12 and receptacle 14, respectively, and are translated longitudinally by sliding them proximally. As noted above, spacing between the insulator modules is maintained by keyway spacers 64, 66.

Longitudinally disposed through each dielectric block are vertically stacked through bores 98, 100, which extend from the back faces 80, 82, to the mating faces 76, 78. The throughbores are configured to accommodate a crimp contact 102 having an integral cylindrical conductor crimp portion 104 and an elongate spring contact element 106 cantilevered forwardly from the crimp portion. The dimensions of the crimp portion may be tailored to the necessary strip length of the wires to be inserted. The spring contact element includes a medial ridge 108 which is driven down by the interaction of a cam portion 110 with a shelf 112 in the throughbore 98, 100 and then snaps back and up to engage the shelf when fully inserted, in the manner of a cantilever snap fit.

The number of insulator modules installed in the connectors is a function of the number of conductors to be managed. As seen in the embodiment above, each insulator module includes eight throughbores, and thus may terminate eight different conductors. While this number may be varied according to need, it will be appreciated that if it is desired to provide more than eight conductors be terminated and connected, more than one insulator module may be placed in the plug, with a complementary mating insulator module in the receptacle.

It will also be appreciated that the most distal insulator modules in the plug mates with the most proximal module in the receptacle, and visa versa. Medial modules mate with medial modules, and so forth. Accordingly, the direction of termination points for terminated conductors in the plug will progress inversely to the expansion in the receptacle: one will progress in the proximal direction and the other will progress in the distal direction.

For instance, when all of the throughbores in a forward/distal insulator module in the plug contain terminated conductors with matable contacts (correspondingly in the matching insulator module in the receptacle), any new or additional conductors must be terminated in a different insulator module for each of the plug and receptacle. Addressing the need to expand to a next insulator module thus entails merely mounting an additional module in each of the plug and receptacle and matching the plug contact with the correspondingly new receptacle contact. In other words, the "expansion" progress in a purely longitudinal direction. Thus, there is no need to expand the outer diameter of the electrical connector housing to accommodate further cables or conductors terminated in the matable elements.

Connecting the plug and receptacle involves both radial and longitudinal translation of one relative to the other. Looking now at FIGS. 2A-4, it is seen in FIG. 2A that the receptacle 14 is rotated about its axis 180 degrees and positioned for radial mating with plug 12. FIG. 2B shows that the distal end 48 of the mounting portion 50 of the receptacle is approximated to the distal ends of the outer shell 22 and inner shell 24 of the plug, and the distal end 38 of the plug is approximated to the distal end 62 of the outer shell of the receptacle, while the upper edge 33 of the mounting portion 30 of the plug is approximated to the upper edge 53 of the mounting portion 50 of the receptacle. The insulator modules are initially offset or staggered in relation to one another when the radial mating is accomplished, and then after radial mating, the plug and receptacle and translated longitudinally toward one another to effect insertion of the cantilevered beam (i.e., male element) 58 into socket 60 (see FIGS. 2A-2B), and to bring the mating faces 76/78 into engagement sufficiently to drive the spring contact elements 106 in the aligned throughbores 98/100 into contact (see esp. FIG. 8B). Front and rear ramps 58a/58b on the male element 58 facilitate deflection to enable its insertion into socket 60, as well as removal from molded hole 116 (see FIG. 4).

The mated pair of plug and receptacle are then locked together by sliding outer shell 22 longitudinally toward the receptacle. By this action the outer shell slides over the mated mounting portions and locks over a spring latch 120, which engages a recess 122 in outer shell 22. This is the locked configuration for an embodiment of the electrical connector.

Referring next to FIGS. 9-13B, in another embodiment 200 of the inventive longitudinally extendable electrical connector, the plug 202 includes a longitudinally oriented PCB 204 having array of vertically disposed spring pin contacts 206, which are radially mated with a complementary array of plated holes 208 in a PCB 210 in the receptacle 212.

As in the earlier embodiment, in this embodiment the plug 202 includes an outer shell 214 slidingly disposed over an inner shell 216, the later extending distally into a truncated cylindrical (arcuate) mounting portion 218 having a distal end 220 and an upper edge 222. The PCB is mounted on a shelf so as to provide a clearance 224 underneath (above, when inverted). Backshell 226 and backshell opening 228 are structurally and functionally comparable to those earlier described. When the outer shell is retracted, an integral arcuate shelf 219 extends from the distal end 217 of the inner shell 216 to provide a support for a complementary element, lip 239, on the receptacle mounting portion, described below.

The receptacle 212 also includes a backshell 230 and backshell opening 232, as well as an outer shell 234 which extends to a distal end 235 and then further distally to a truncated cylindrical (arcuate) mounting portion 236, which has a distal end 238 extending further to a lower lip 239, as well as an upper edge 240. The degrees of arc described by the receptacle mounting portion complements the degrees of arc described by the plug mounting portion such that together they describe a full 360 degrees of arc.

To facilitate secure coupling of the plug and receptacle, the receptacle PCB 210 is configured with lateral tabs 242 which insert into slots 244 in the plug mounting portion inner wall 246. The PCB is mounted on a mounting block 250 which secures and stabilizes the PCB and separates the PCB from the mounting portion inner wall 252 so as to provide clearance 254 for the spring contacts 206 to insert.

Looking ahead now to FIGS. 13A-13B, the spring contact PCB 204 includes an inner (or lower) board portion 204a and an outer (or upper) board portion 204b. The inner board portion includes an array of plated through-holes 207 for terminating wire/cable conductors, each through-hole one mapped and connected to a corresponding spring contact 206 on the outer board portion 204b a circuit trace (not shown). The spring contacts 206 are each soldered in plated through-holes on the outer board 204b. The formed spring contacts 206 themselves comprise opposing bowed resilient conductive metal springs formed from wire which together form an upright selectively insertable/removable compressible spring contact. The spring contacts each removably mate to the inside walls of corresponding plated through-holes 208a in the receptacle PCB 210. The deflected spring contact applies a normal force to the mating plated through-hole to maximize the electrical contact force while minimizing insertion and removal force.

The receptacle PCB 210 also includes an outer board 210a and an inner board 210b, each including plated through-holes, 208a, 208b, each inner board through-hole 208b mapped to and electrically connected to a plated through-hole 208a in the outer board 210a through a circuit trace. The spring contacts and through-holes are arranged in rows of two contacts and any of a number of columns, the latter oriented generally longitudinally.

Referring next to FIGS. 10A-12, mating the plug and receptacle involves rotating these structures so that the printed circuit boards 204, 210 are facing one another and the spring contacts 206 of the plug circuit board 204 are aligned for insertion into the plated through-holes 208 of the receptacle printed circuit board 210. Accordingly, the selective mating is exclusively radial, and no longitudinal translation is involved after radial mating. Indeed, such movement is contraindicated, which is why structure is provided to entirely prevent it.

Once the spring contacts are fully inserted into the plated through-holes, the sliding outer shell 214 is translated down the plug barrel over the receptacle mounting portion 236 until a detent 258 engages a locking spring 260. This prevents radial separation of the plug and receptacle and provides enhanced environmental protection for the electronics.

Figure 14A:
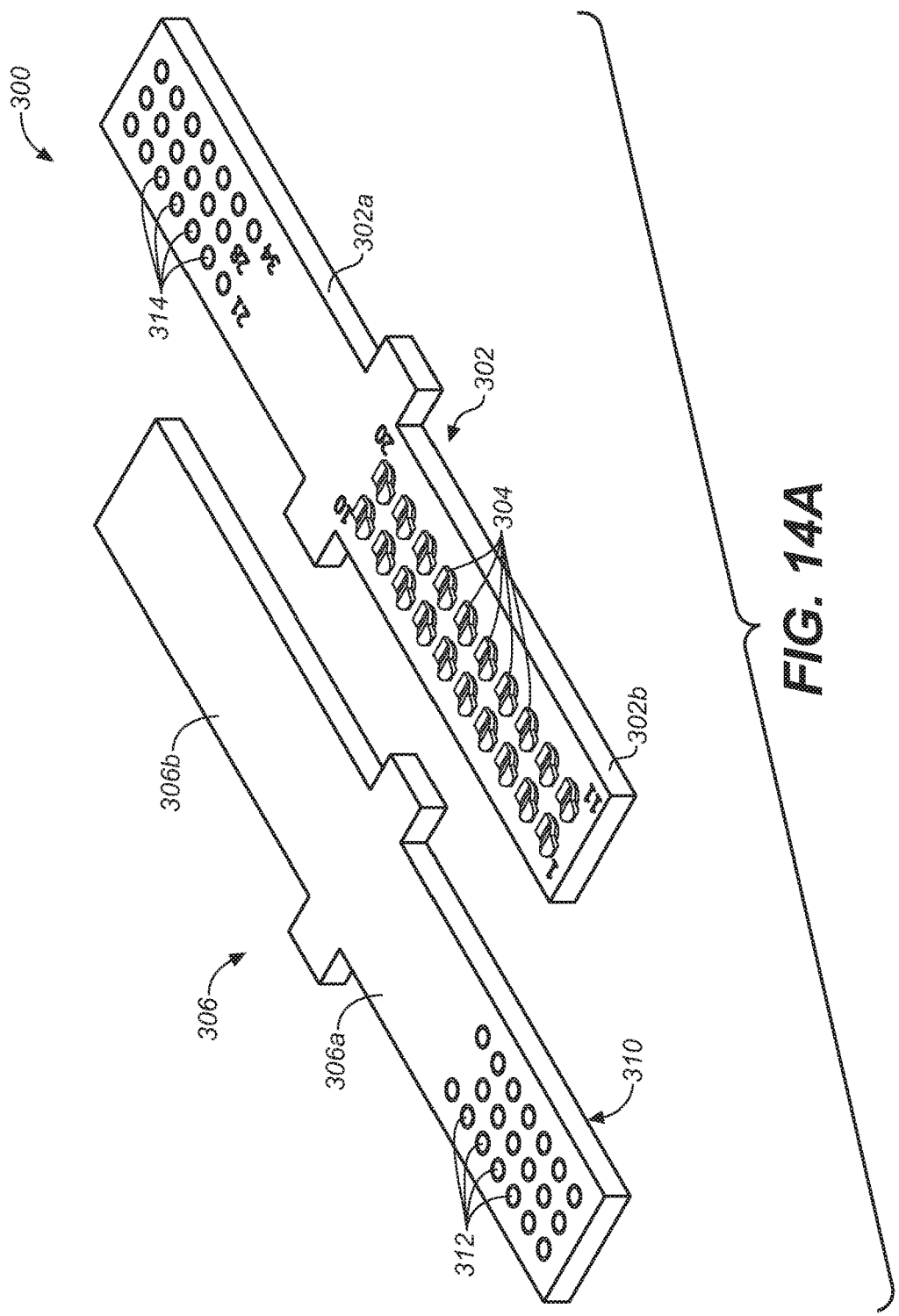
FIG. 14A is an upper perspective view showing an alternative PCB interconnect pair for use in the longitudinally expandable connector, this PCB pair having a first PCB with conductive contact pads for radial mating with a complementary PCB having a matching array of spring contacts shown in FIG. 14A.
Figure 14B:
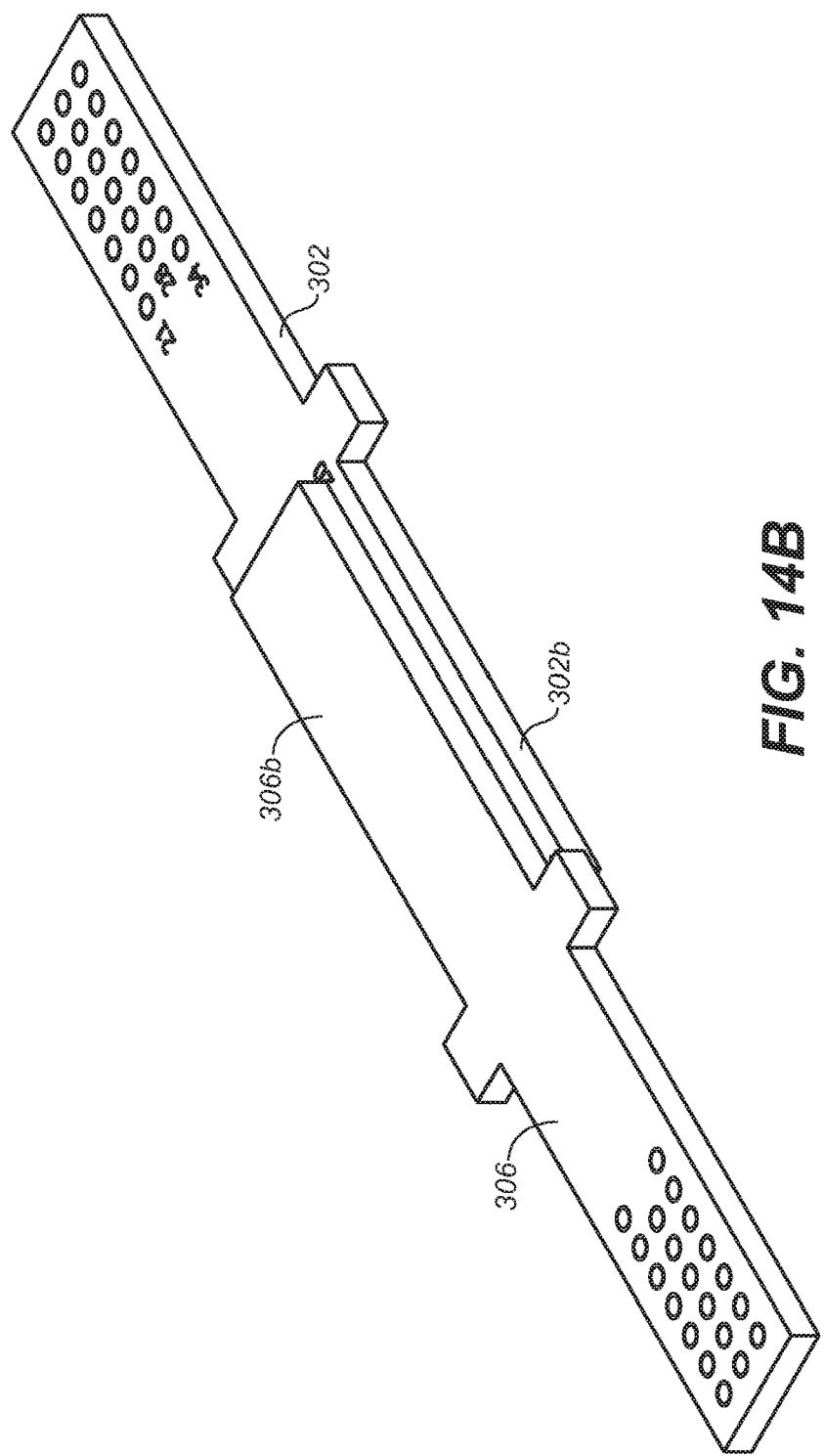
FIG. 14B shows the spring contact array (interposer) mated to the interconnect pad of FIG. 14A.

An alternative PCB pairing 300 is shown in FIGS. 14A-14B, where there is shown an interposer board 302 for a plug member and having an array of uncompressed spring contacts 304 configured for pairing with a PCB 306 in a receptacle and having an array of plated conductive (preferably gold plated) pads 308 (not shown) disposed on the underside 310 of the PCB, and well known in the art. The interposer board includes an inboard/proximal portion 302a and an outboard/distal portion 302b. The conductive pads 308 on the PCB are mapped to and electrically connected by circuit traces to plated through-holes 312 used for terminating conductors, and the spring contacts 304 are electrically connected to plated through-holes 314. The pitch, working range, and spring constant are tailored to ensure that the deflected contacts apply a normal force to the mating plated pads, and the contact force equals the mating force. The receptacle PCB also includes an inboard/proximal portion 306a and an outboard/distal portion 306b. As will be readily appreciated, spring contacts, pads, and through-holes are all arranged in rows and columns, the latter running generally longitudinally.

In each of the embodiments using matable contacts on PCB boards ("spring contact-and-hole", and "spring contact and pad"), the contact arrays are configured with hole, pin, and pad patterns that are principally longitudinal in orientation. Thus, for each of the spring contact-and-pad and spring contact-and-hole embodiments, an initial terminating plan may not call for terminating a number of cables or conductors that would make use of all of the conductor terminating points 207/208b, and 312/314 on the inner portions of the PCBs. However, if it were desired to connect further conductors, as each row of termination points is filled, "expansion" entails connecting additional conductors down the column, either in the distal or proximal direction, in the discretion of the user. In either case, no expansion of the outer diameter of the connector housings is required. Indeed, if necessary, within the dimensional constraints of the connector housings, the PCBs can be replaced with boards having more longitudinally oriented termination and contact points.

From the foregoing it will be clear to those with skill in the art that the electrical connector of the present invention is configured to accommodate increasingly large numbers of conductors without having to expand the circumference or outer diameter of the terminal portions of either the plug or receptacle. Instead, as wires are added or introduced into the embodiment shown in FIGS. 1-8B, longitudinally disposed insulator modules are added to provide an increasing number of connectable contacts. Each module accommodates eight (8) more wires, without any increase in the diameter of the connector. Including more conductors (in number or size or both) in the embodiments shown in FIGS. 9-14B simply involves terminating wires in the properly identified corresponding plated holes in the respective plug and receptacle PCBs.

Furthermore, it will be clear that the connector housings need not be cylindrical in shape (circular in cross section). The invention naturally encompasses alternative geometries without any impact on function, such geometries most notably including elongate cuboid (square or rectangular in cross section). It will be appreciated that the insulator modules would be modified correspondingly, with keying features fitted to keyways disposed in the sidewalls of the cuboid plug and receptacle mounting portion structures.

Thus, in a most essential aspect, the electrical connector of the present invention will be seen to include a plug member including a housing having an elongate tubular housing portion and a partially open mounting portion integrally extending from the tubular portion and configured for mating with a complementary receptacle, and a longitudinally oriented array of male electrical elements; a receptacle including a housing having an elongate tubular housing portion and a partially open mounting portion integrally extending from the tubular portion and configured for mating with the plug, wherein when the plug and the receptacle are mated, the partially open portions combine to form a tubular enclosure axially continuous with the tubular housing portions, and longitudinally oriented array of female electrical elements; and a locking structure to lock the plug and the receptacle into a mated configuration.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A longitudinally expandable electrical connector, comprising:
    a plug including a plug proximal end having an opening through which to introduce conductors, a plug inner shell extending distally from said plug proximal end and having a plug inner shell distal end, an elongate partial tubular plug mounting portion extending distally from said plug inner shell distal end, said plug mounting portion having a plug mounting portion inner wall with upper edges and a plug mounting portion distal end;
    a receptacle configured complementarily to said plug and including a receptacle proximal end having an opening through which to introduce conductors, a receptacle outer shell extending distally from said receptacle proximal end and having a receptacle outer shell distal end, an elongate partial tubular receptacle mounting portion extending distally from said receptacle outer shell distal end, said receptacle mounting portion having a receptacle mounting portion inner wall with complementary edges and a receptacle mounting portion distal end, said receptacle mounting portion configured such that when said upper edges of said plug mounting portion are aligned and approximated to said complementary edges of said receptacle mounting portion so as to mate said receptacle with said plug, said plug mounting portion and said receptacle mounting portion form a tubular enclosure and said upper edges of said plug mounting portion are approximated to said complementary edges of said receptacle mounting portion;
    a longitudinally oriented plug contact array disposed in said plug mounting portion and having a plurality of termination points for terminating conductors and a plurality of contacts for matable electrical contact with a complementary array in said receptacle;
    a longitudinally oriented receptacle contact array disposed in said receptacle mounting portion complementary to said plug contact array and having a plurality of contacts configured to mate electrically with said plurality of contacts in said plug contact array; and
    a locking feature for locking said plug and said receptacle in a mated configuration to prevent radial separation of said plug and said receptacle, wherein when said plug and said receptacle are in the mated configuration, said distal end of said plug inner shell approximates the distal end of said mounting portion of said receptacle, and said distal end of said receptacle inner shell approximates the distal end of said mounting portion of said plug;
    wherein each of said plug contact array and said receptacle contact array includes a plurality of longitudinally spaced apart modular insulators, said modular insulators including a mating face, a back side, and a plurality of longitudinally oriented throughbores, each of said throughbores configured to accommodate electrical contacts and to terminate electrical conductors, wherein the most distal modular insulator in said plug mates with the most proximal modular insulator in said receptacle through lateral translation of said plug in relation to said receptacle.

2. The electrical connector of claim 1, further including a backshell on each of said plug and said receptacle, either disposed over or integral with said inner shell.

3. The electrical connector of claim 1, wherein said locking feature is an outer shell slidably disposed over said inner shell of said plug when in an unlocked configuration.

4. The electrical connector of claim 1, wherein mating of said plug and said receptacle is achieved through radial translation only.

5. The electrical connector of claim 1, wherein mating of said plug and said receptacle is achieved through a combination of radial translation and longitudinal translation.

6. The electrical connector of claim 1, wherein said plug inner shell includes a socket and said distal end of said receptacle mounting portion includes a snap fit element for releasable locking insertion into said socket.

7. The electrical connector of claim 1, wherein said each of said plug mounting portion and said receptacle mounting portion includes keyway slots on interior walls and said modular insulators include surface features that fit slidingly into said keyway slots.

8. The electrical connector of claim 1, wherein said receptacle includes a PCB having an outer portion with a longitudinally oriented array of plated conductive pads, and said plug includes an interposer board having a longitudinally oriented array of compressible spring contacts which radially mate with said plated conductive pads.

9. The electrical connector of claim 1, wherein said plug includes a PCB having an outer portion with a longitudinally oriented array of vertically disposed spring pin contacts, and said receptacle includes a PCB having an outer portion with a longitudinally oriented array of plated through-holes which radially mate with said spring pin contacts.

10. The electrical connector of claim 9, wherein each of said PCB boards include an inner portion having termination points for terminating conductors.

11. The electrical connector of claim 10, wherein said spring pin contacts comprise opposing bowed resilient conductive metal springs formed from wire which removably insert into and mate with the inside walls of corresponding plated through-holes.

12. An electrical connector, comprising:
   a plug including a plug housing having an elongate tubular plug housing portion and a partially open plug mounting portion integrally extending from said plug housing portion and configured for mating with a complementary receptacle, and a longitudinally oriented array of male electrical elements;
   a receptacle including a receptacle housing having an elongate tubular receptacle housing portion and a partially open receptacle mounting portion integrally extending from said receptacle housing portion and configured for mating with said partially open plug mounting portion, wherein when said plug and said receptacle are mated, said partially open plug mounting portion and said partially open receptacle mounting portion combine to form a tubular enclosure axially continuous with said tubular housing portions, and longitudinally oriented array of female electrical elements; and
   a locking structure to lock said plug and said receptacle into a mated configuration wherein said male electrical elements are slidably inserted into, and brought into electrical contact with, said female electrical elements by translating said partially open plug mounting portion longitudinally in relation to said partially open receptacle mounting portion.

13. The electrical connector of claim 12, wherein said housing is cylindrical in cross-section.

14. The electrical connector of claim 12, wherein said housing is not cylindrical in cross-section.

\* \* \* \* \*

UNITED STATES PATENT AND TRADEMARK OFFICE
CERTIFICATE OF CORRECTION

PATENT NO. : 10,283,896 B1
APPLICATION NO. : 15/950117
DATED : May 7, 2019
INVENTOR(S) : Ronald Charles Hennon and Mark McGrath It is certified that error appears in the above-identified patent and that said Letters Patent is hereby corrected as shown below:

On the Title Page

Item (73), The name of the assignee should be corrected to read, ICORE INTERNATIONAL, INC.

Signed and Sealed this
Twenty-second Day of October, 2019

Andrei Iancu
*Director of the United States Patent and Trademark Office*